United States Patent [19]

Synatschke et al.

[11] Patent Number: 5,086,877
[45] Date of Patent: Feb. 11, 1992

[54] LUBRICANT SUPPLY LIMITING DEVICE

[75] Inventors: Dieter Synatschke, Mannheim; Paul Sattelberger, Reilingen; Werner Saam, Oberhausen-Rheinhausen, all of Fed. Rep. of Germany

[73] Assignee: 501 Joseph vogele AG, Mannheim, Fed. Rep. of Germany

[21] Appl. No.: 484,842

[22] Filed: Feb. 26, 1990

[30] Foreign Application Priority Data

Mar. 2, 1989 [DE] Fed. Rep. of Germany ....... 3906683

[51] Int. Cl.⁵ .............................................. F16N 27/00
[52] U.S. Cl. ..................................... 184/7.4; 184/6.1; 137/501
[58] Field of Search ............. 184/6.1, 6.4, 7.4; 60/459, 466, 494; 91/46, 433, 385, 388; 137/501

[56] References Cited

U.S. PATENT DOCUMENTS

| | | | |
|---|---|---|---|
| 2,521,615 | 9/1950 | Walker | 184/7.4 |
| 2,990,915 | 7/1961 | Anders | 184/6.4 |
| 3,145,803 | 8/1964 | Cobert | 184/7.4 |
| 3,260,273 | 7/1966 | Hayner | 91/388 |
| 3,502,100 | 3/1970 | Jonson | 137/501 |
| 3,680,586 | 8/1972 | Bourgeois | 137/501 |
| 3,807,443 | 4/1974 | Jacobs | 137/501 |
| 4,337,787 | 7/1982 | Rhodes | 91/46 |
| 4,478,250 | 10/1986 | Lukasczyk et al. | 91/433 |
| 4,585,206 | 4/1986 | Itoh | 137/614.11 |
| 4,646,622 | 3/1987 | Ishizaki et al. | 91/454 |
| 4,790,511 | 12/1988 | Gehrig et al. | 251/30.02 |
| 4,843,902 | 7/1989 | Patton et al. | 74/335 |

FOREIGN PATENT DOCUMENTS 3339016 8/1986 Fed. Rep. of Germany .
3637851 5/1988 Fed. Rep. of Germany .

Primary Examiner—Ira S. Lazarus
Assistant Examiner—Alan B. Cariaso
Attorney, Agent, or Firm—Finnegan, Henderson, Farabow, Garrett & Dunner

[57] ABSTRACT

A lubricant supply limiting device (1') for a lubrication system, wherein at least one fixed throttle (F) and a servo pressure controller (3) provided with a variable throttle (D) are disposed in the flow path, and wherein an adjustment member (6') for the variable throttle (D) is subjected to the resilient action of an actuator, is provided with a proportional solenoid (15) acting as the actuator for selectively adjusting the lubricant flow to the demand at specified lubrication points. A proportional solenoid (15) is moreover advantageous for general use in servo pressure controllers to act on the adjustment member thereof in a manner permitting the pressure differential maintained by the servo pressure controller and determined by a fixed throttle to be varied. In a lubrication system, a supply limiting device controlled by a proportional solenoid (15) is included in a control circuit in which a current control device (52) is operable to vary the current supply to the proportional solenoid (15) in response to demand at specified lubrication points. Alternatively the supply limiting device including the proportional solenoid may be incorporated in a closed control circuit in which the current supply to the proportional solenoid (15) is automatically controlled by means of a current control device (61) in accordance with the actual lubricant flow and a reference value related to specified lubrication points.

16 Claims, 4 Drawing Sheets

LUBRICANT SUPPLY LIMITING DEVICE

BACKGROUND OF THE INVENTION

The present invention relates to a lubricant supply limiting device and to a servo pressure controller for use with the device.

In a lubricant supply limiting device of the type known from DE Patent 3,637,851, the adjustment member of the servo pressure controller is subjected to the action of a compression spring acting as the actuator, to thereby ensure that the variable throttle maintains the pressure difference established by the fixed throttle so as to ensure a constant lubricant flow independently of upstream and downstream pressures. For adjusting the lubricant flow to varying requirements at specified lubrication points, the lubricant flow can be switched between several fixed throttles, or one or more fixed throttles may be used at the same time. The fixed throttle or throttles used at any given time determines—or determine—the pressure difference and thus the lubricant flow which is maintained constant by the variable throttle of the servo pressure controller. The variation of the lubricant volume flow requires the employ of a considerably complicated construction. In addition, the variation of the volume flow occurs incrementally, so that it may not always be possible to accurately adjust the volume flow to the requirements of specified lubrication points.

Although it would be possible to avoid this incremental adjustment of the volume flow by the employ of a continuously adjustable fixed throttle in a flow control valve having a fixed throttle and a servo pressure controller—as is common use in the field of hydraulics—, with an actuator solenoid for adjusting the fixed throttle, the pressure difference over the fixed throttle is usually of a magnitude requiring the application of excessive adjustment forces. It is moreover difficult to reliably hold the fixed throttle at the selected adjustment position.

SUMMARY OF THE INVENTION

It is an object of the invention to provide a lubricant supply limiting device of the type defined in the introduction, which is of simple construction and permits the lubricant flow to be individually adjusted with high accuracy to requirements of specified lubrication points.

The object stated above is attained according to the invention by providing a lubricant supply limiting device for a lubricant distribution system comprising a pressurized lubricant supply path, at least one fixed throttle and a servo pressure controller having variable throttle means disposed in the lubricant path, said controller being downstream of and responsive to variations in the pressure drop over the fixed throttle, said variable throttle means including an adjustment member for controlling the flow of lubricant through the controller and a proportional solenoid for adjusting the position of the adjustment member.

The proportional solenoid acting on the adjustment member of the servo pressure controller permits the lubricant volume flow predetermined by the fixed throttle to be continuously varied in response to demand. Depending on the manner in which the proportional solenoid is devised to act on the adjustment member, the proportional solenoid may be employed so that a maximum volume flow predetermined by the fixed throttle is continuously controlled "down", or so that a predetermined minimum volume flow is controlled "up". Particularly suitable is the employ of the lubricant supply limiting device in the construction of automotive body presses or in paper-making machines in which the lubricant demand at specified lubricating points is variable. Since the modification of the overall concept of the lubricant supply limiting device is rather insignificant, it is possible to modify supply limiting devices already in operation. It is also possible to retain existing conventional auxiliary components, such as signal generators acting as monitoring or detector elements. The ability to vary the volume flow in response to demand permits for instance a viscosity-dependent backup pressure in a still cold machine to be prevented by suitably adjusting the supplied oil flow. In the case of open lubrication points, for instance on presses, it is possible to reduce oil losses caused by splashing, and contaminations of the processed articles. It is still further possible to avoid performance losses caused by unnecessarily strong lubricant flows. The employ of the machine element "lubricant" can be carefully controlled to thereby prolong its useful life. The proportional solenoid offers the advantage that its magnetic force is proportional to the current input, so that the volume flow is readily variable during operation of the lubricant supply limiting device by technically simple control means. The proportional solenoid acts on the adjustment member in the manner of a variable-bias spring without variation of its effective length. The low hysteresis, the positive proportionality of the magnetic force to the current input and the thus accurately known variation of the magnetic force permit the operational characteristic of the lubricant supply limiting device to be accurately predetermined in a reproducible manner.

BRIEF DESCRIPTION OF THE DRAWINGS

Embodiments of the subject matter of the invention shall now be described with reference to the drawings, wherein.

DETAILED DESCRIPTION OF THE INVENTION

Figure 1:
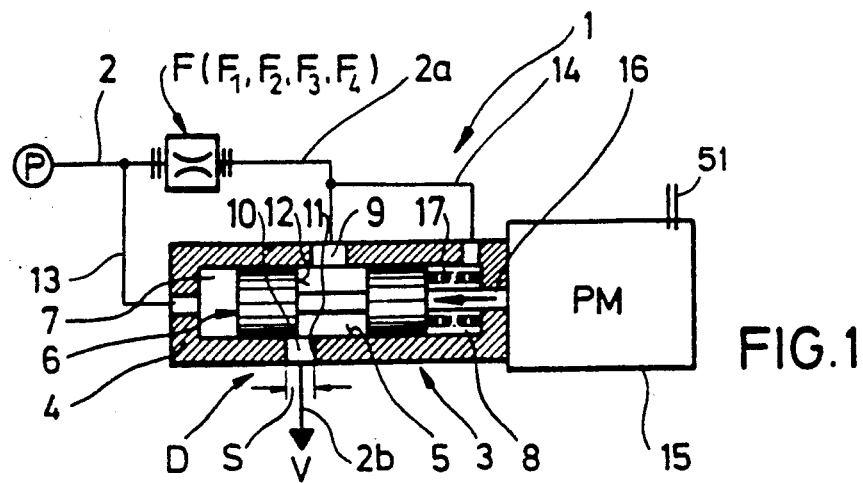
FIG. 1 shows a diagrammatic illustration of a servo pressure controller.

A supply limiting device 1 shown in FIG. 1 is connected to a pressure source P through a conduit 2. Disposed in conduit 2 is a fixed throttle F in a manner permitting it to be replaced by fixed throttles F1 to F4 for different pressure differentials. A conduit 2a extends from fixed throttle F to an inlet 9 of a housing 4 of a servo pressure controller 3. A conduit 2b connects an outlet port 10 of housing 4 to a consumer V. In use of supply limiting device 1 as a lubricant supply limiter, consumer V may for instance be a lubrication point or a lubricant distributor.

Slidingly and sealingly guided in a housing chamber 7 of housing 4 is an adjustment member 6 in the form of a tandem piston provided with a control edge 12 adapted to cooperate with a control edge 11 adjacent outlet port 10 to act as a variable throttle. A control conduit 13 extends from a point of conduit 2 upstream of fixed throttle F to a portion of housing chamber 7 defined by one end face of adjustment member 6. The other end face of adjustment member 6 defines a chamber 8 connected through another control conduit 14 to a point of conduit 2a downstream of fixed throttle F. Attached to housing 4 is a proportional solenoid PM, 15, having electrical control lines 51 and having a push rod 16 projecting into chamber 8 to directly act on adjustment member 6. Within chamber 8, adjustment member 6 may be additionally subjected to the action of a spring 17, preferably a pre-biased compression spring, acting parallel to push rod 16. The servo pressure controller is also capable, however, of functioning with proportional solenoid 15 alone. Proportional solenoid 15 is characterized in that it generates a magnetic force in proportion to its current input to thereby act on adjustment member 6.

Adjustment member 6 is displaceable over a stroke length S between the completely opened state and the completely closed state of the variable throttle (control edges 11,12). The stroke length of which push rod 16 of proportional solenoid 15 is capable is preferably greater than stroke length S.

Figure 3:
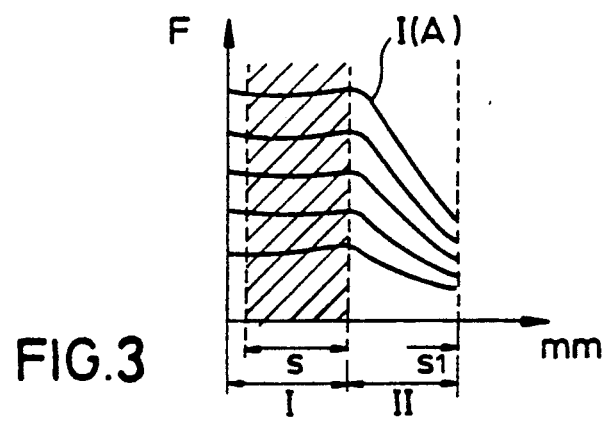
FIG. 3 shows a diagram representing the relationship between the magnetic force and the stroke length for different current input values of a proportional solenoid.

FIG. 3 illustrates the variation of the magnetic force F over the stroke of push rod 16 (in mm). A given current input I (in Ampere) to proportional solenoid 15 results in a determined magnetic force over the stroke length. From the solid lines in FIG. 3 it is apparent that the magnetic force/stroke characteristic curves over the full stroke S1 of proportional solenoid 15 have a first characteristic section I and a second characteristic section II clearly different therefrom. In first section I the magnetic force F remains substantially constant, while in second section II the magnetic force F shows a relatively steep decline. The hatched area extending over a width S in the diagram indicates that proportional solenoid 15 as in FIG. 1 is geometrically coupled to adjustment member 6 in such a manner that it acts thereon with an approximately constant magnetic force over the stroke length S of the variable throttle between its fully opened and its fully closed state. In other words, proportional solenoid 15 in FIG. 1 acts on adjustment member 6 in the manner of a spring capable of exerting a substantially constant spring force over a predetermined portion S of its longitudinal deformation. That is to say, variable throttle D functions by the action of the substantially constant force exerted over the stroke length S, the value of this force being variable in response to the current input to proportional solenoid 15.

Thus it is important that the full stroke $S_1$ be greater than the adjustment stroke S thus permitting a determined section of the stroke of the proportional solenoid to be selected for the operation of the variable throttle, i.e. a section of the stroke along which the magnetic force varies in a determined manner and is thus useful for obtaining optimum operational characteristics of the supply limiter. It is obvious that the proportional solenoid can selectively be arranged to exert either a pull or a thrust force.

By a suitable geometrical coupling of the proportional solenoid 15 to the adjustment member 6 it is possible to ensure that only a certain part of the total stroke is made use of, i.e. a part of the stroke corresponding to the adjustment stroke of the variable throttle, and in which the magnetic force varies in a determined manner. In practical application it has been found particularly suitable to make use of the first part of the magnetic force/stroke characteristics with substantially constant variation of the magnetic force, to thereby obtain clearly defined operational characteristics of the supply limiter. It is also conceivable, however, to make use of the second part of the magnetic force/stroke characteristics to thereby actuate the adjustment member in a similar manner as in the case of a spring having increasing or decreasing spring characteristics.

Neglecting at first instance the force of spring 17, the volume flow predetermined by the pressure drop over fixed throttle F and maintained constant by servo pressure controller 3 by the action of a determined magnetic force independently of pressure variations in conduits 2 and 2b, may be varied by varying the magnetic force. Since the magnetic force Ff of proportional solenoid 15 is continuously variable, the volume flow supplied to consumer V through conduit 2b can likewise be continuously varied.

Figure 4:
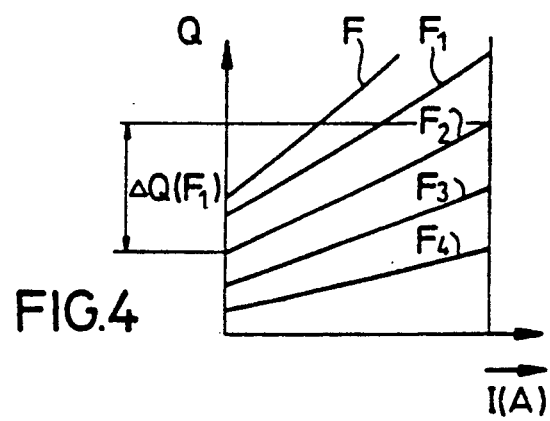
FIG. 4 shows a diagram representing the relationship between the volume flow per time unit and the current input.

The solid lines designated F, F1 to F4 in FIG. 4 show the volume flow Q associated to respective fixed throttle sizes or fixed throttle pressure drops and variable in response to the current I supplied to proportional solenoid 15. It is thus for instance evident from curve F1 that an increase of the current supply results in a variation ΔQ of the volume flow for one and the same fixed throttle F1. In the diagram of FIG. 4, the volume flow is controlled UP from a lower limit value in the vertical plane of the diagram. In this case the lower limit value is determined by the force of spring 17 (FIG. 1). Proportional solenoid 15 is suitably controlled in such a manner that its magnetic force starts to act at this lower limit value of the flow volume to thereby obtain the widest possible control range. In the arrangement of FIG. 1 this implies that even without any current input to proportional solenoid 15, adjustment member 6 cannot completely close variable throttle D, adjustment member 6 being in this case held by spring 17 alone in a position in which variable throttle D is kept open to a degree ensuring a minimum volume flow.

The spring acting on the adjustment member in parallel to the proportional solenoid thus offers the advantage that the supply limiter remains capable of functioning to ensure a predeterminable minimum volume flow even when the proportional solenoid fails. The spring is suitably integrated in the servo pressure controller in such a manner that it ensures a predetermined mimimum supply, while the proportional solenoid acts to determine a variable proportion of the supply. The spring suitably acts on the adjustment member in the same direction as the proportional solenoid. It is also conceivable, however, to provide an arrangement in which the proportional solenoid acts in the direction against the spring. The spring may then for instance be used for determining a maximum volume flow, which can be reduced to a minimum volume flow by the action of the proportional solenoid in response to demand. The pre-bias of the spring may also be adjustable so as to permit different datum adjustments to be realized.

By having the magnetic force start to act at the lower limit value of the flow volume this permits a wide variation range of the volume flow to be achieved, because the magnetic force of the proportional solenoid comes into action only at a point whereat the spring alone becomes incapable of effective action. On the other hand this ensures that a minimum volume flow is maintained for emergency operation in case of failure of the proportional solenoid.

Figure 2:
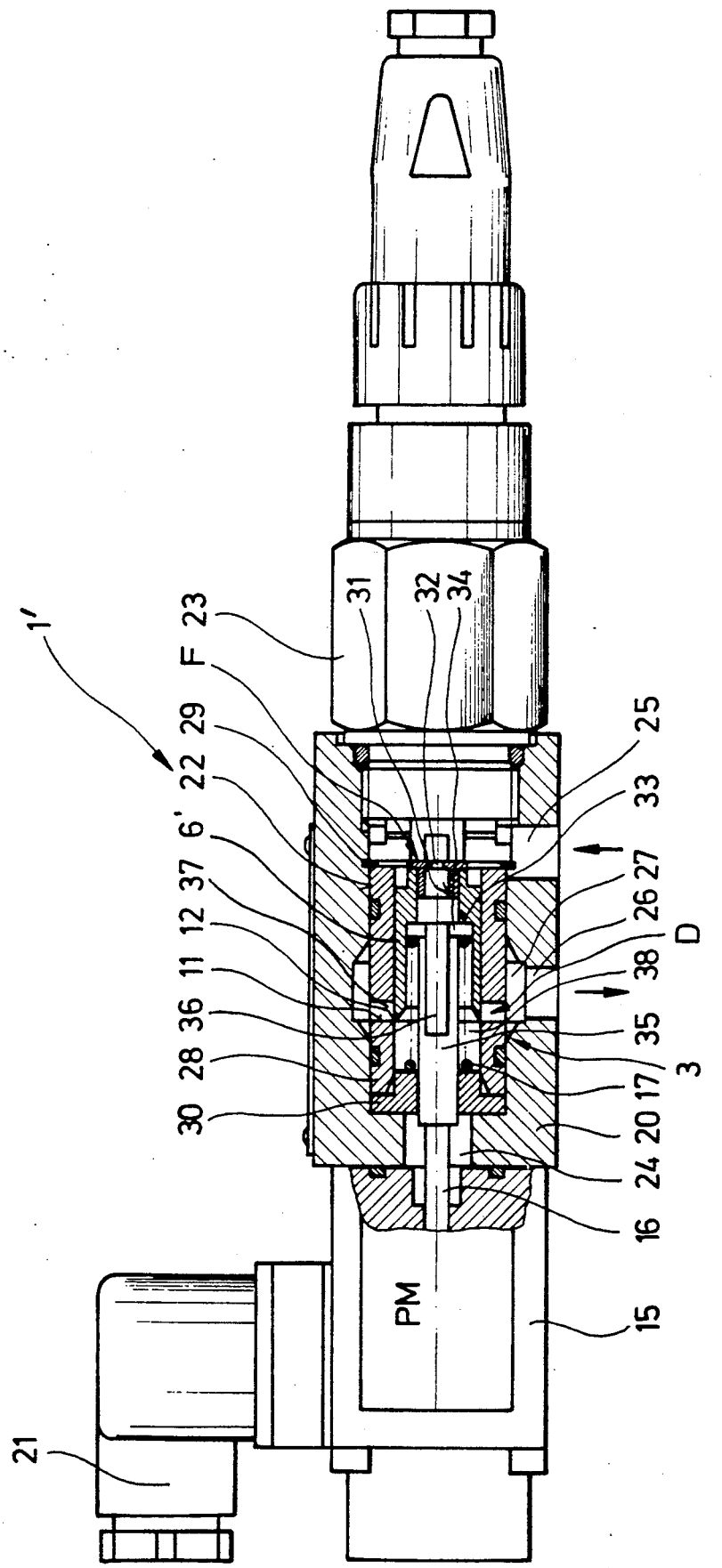
FIG. 2 shows a partially sectioned sideview of a lubricant supply limiting device for a lubrication system.

The supply limiting device 1' shown in FIG. 2 corresponds to the supply limiter of FIG. 1 as regards its function. Identical components are therefore designated by the same reference numerals.

The housing 20 of supply limiting device 1' is formed with a stepped bore 22 extending longitudinally therethrough and having a signal generator 23 threaded into its larger end. Secured to the other end of housing 20 is proportional solenoid 15 having a push rod 16 extending into bore 22 and an outer terminal portion 21 for the current supply thereto. Proportional solenoid 15 is designed as a wet magnet in pressure-transmitting communication with bore 22 through an inlet portion 24. The advantage of a wet solenoid is that it forms a completely enclosed unit with the supply limiter so that its functions are not impaired by the medium controlled by the supply limiter and possibly entering the proportional solenoid. Bore 22 also communicates with an inlet port 25 and defines an annular chamber 27 communicating with an outlet port 26. Secured in position in bore 22 between respective stops 29 and 30 is a guide sleeve 28 formed with outlets 37 in alignment with annular chamber 27. The adjustment member 6' of the servo pressure controller 3 is a cup-shaped piston having fixed throttle F in the form of a cap 31 with a throttle bore 32 therethrough inserted into its bottom end facing away from proportional solenoid 15. Supported on a shoulder 33 within adjustment member 6' is a collar member 34 cooperating with a rod-shaped transmission member 35 itself subjected to the action of push-rod 16 of proportional solenoid 15. This provides a simple construction resulting in the avoidance of actuating force losses in the transmission path from the proportional solenoid to the adjustment member, and additionally in a very compact structure for the supply limiter. Slots 36 permit the lubricant to enter a chamber 38 formed in guide sleeve 28 after its passage through throttle bore 32. The lateral outlets 37 are provided with control edges 11 cooperating with the control edge 12 formed by the open end of the cup-shaped piston to act as variable throttle D. Spring 17, preferably a pre-biased compression spring, is supported on stop 30 and has its other end supported on collar member 34. Thus all of the cooperating components are accommodated in a narrow space. The adjustment member in the form of a cup-shaped piston permits a highly responsive control operation to be achieved. Its operation is substantially independent of the consistency of the lubricant, and its manufacture and assembly is accomplished in an economical manner.

The operation of supply limiting device 1' corresponds to that of supply limiting device 1 of FIG. 1. Signal generator 23 monitors the displacements of adjustment member 6' and generates stroke-dependent signals permitting the correct operation of supply limiting device 1' to be observed. Signal generator 23 may be unscrewed for replacement of fixed throttle F by another fixed throttle having a bore of a different size to result in a different pressure drop. By allowing for exchangeability of the fixed throttle or the selective simultaneous operation of several fixed throttles a wide range of predeterminable volume flows is available, the thus determined volume flows being then variable in response to demand by the action of the proportional solenoid.

Figure 5:
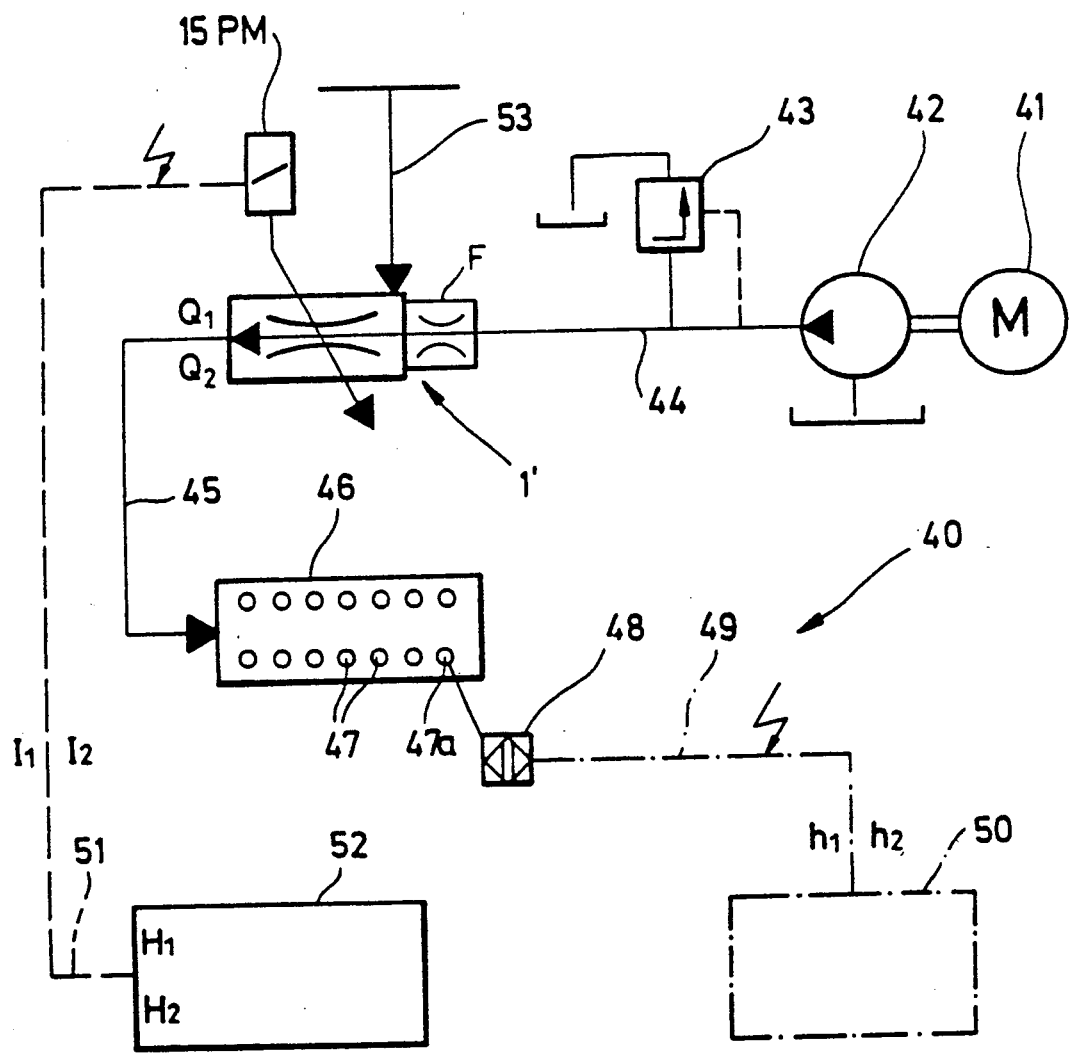
FIG. 5 shows a block circuit diagram of a lubrication system controlled in response to demand.

FIG. 5 illustrates a lubrication system 40 incorporating the supply limiting device 1' with its proportional solenoid PM, 15.

A motor 41 drives a pump 42 for supplying a lubricant flow to a main conduit 44 through a pressure limiting valve 43. Supply limiting device 1' is disposed between main conduit 44 and a supply conduit 45 leading to a progressive piston distributor 46. The latter contains a plurality of metering pistons 47, of which the one designated at 47a cooperates with a stroke detector device 48 itself connected to a monitoring device 50 by a conductor 49. Proportional solenoid 15 of supply limiting device 1' is supplied through a conductor 51 with a current of a strength selected by a current control circuit 52 in response to the lubricant demand at specified lubrication points. In the present case current control circuit 52 is designed to supply at least two current values determined for instance by operating conditions of a machine (e.g. full load, partial load or the like) indicative of the amount of lubricant to be supplied to lubrication points connected to the progressive piston distributor. Monitoring device 50 is designed to respond to two limit values derived from the output signal of stroke detector device 48. Stroke detector device 48 may for instance act to detect the number or strokes per time unit of piston 47a as an accurate indication of the partial flow to each lubrication point. When the monitoring device detects a deviation beyond the limit values, it may act to activate a warning device.

As long as the machine having the lubrication points operates under partial load, control circuit 52 selects a reduced current supply to proportional solenoid 15. As a result, supply limiting device 1' reduces the volume flow in conduit 45 to a constant, albeit lower value. When the machine arrives at its full load operation, control circuit 52 switches the current supply to proportional solenoid 15 to a higher value, as a result of which a stronger and again constant volume flow flows through conduit 45.

Figure 6:
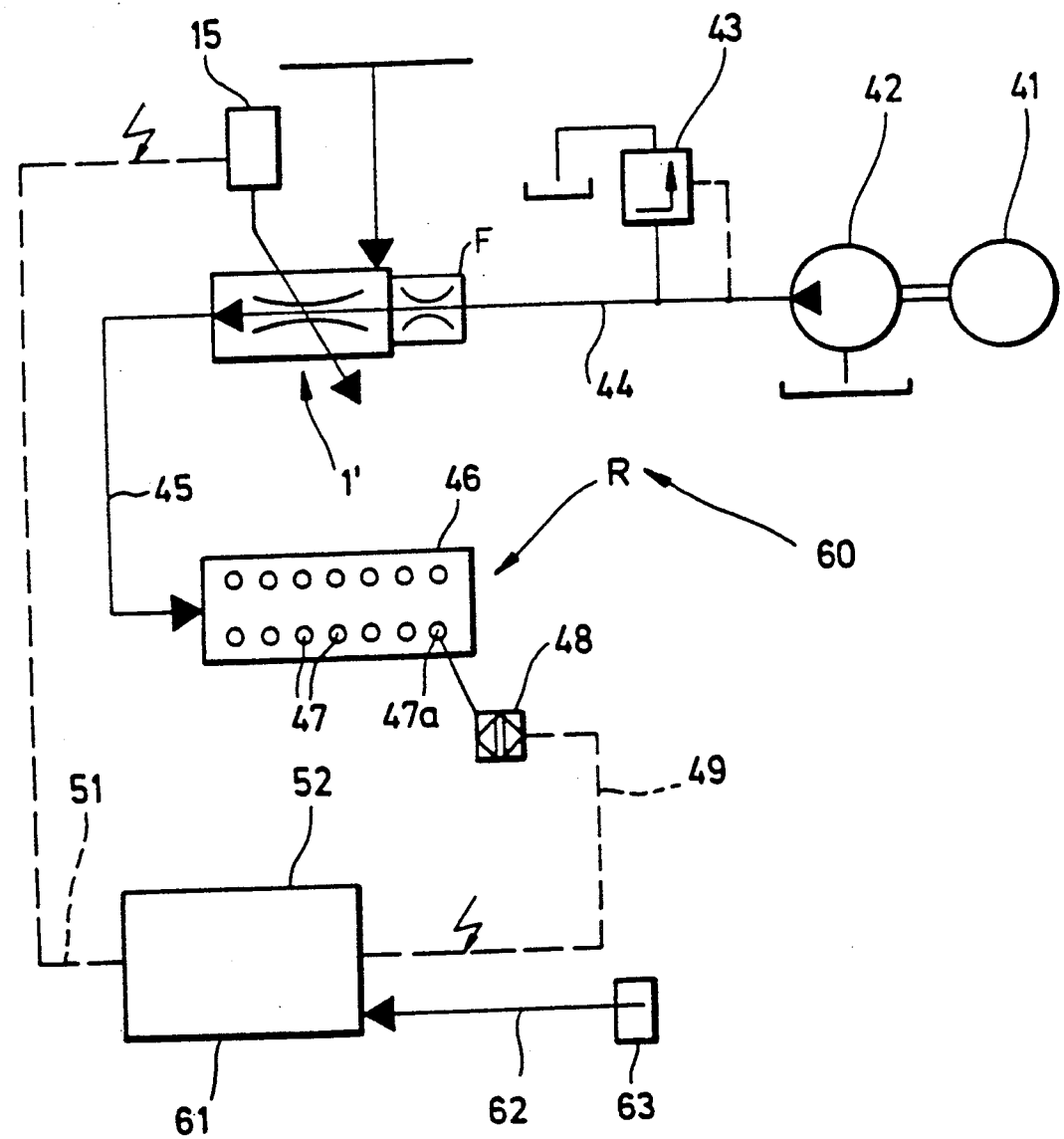
FIG. 6 shows a block circuit diagram of a lubrication system adapted to be automatically controlled in response to demand.

The lubrication system 60 shown in FIG. 6 includes a self-contained control circuit permitting it to automatically adapt itself to the requirements or demand at specified lubrication points. The lubrication system 60 is more or less similar to the lubrication system 40 shown in FIG. 5. By way of contrast thereto, the output conductor 49 of stroke detector device 48 is connected to a control input of a current control unit 61, a second control input of which is connected via a conductor 62 to a reference value generator 63 operable to generate reference values representative of the load condition of the machine, of temperature, or of the start-up condition. The current supply to proportional solenoid 15 via conductor 51 is continuously variable, so that the volume flow in supply conduit 45 is always adjusted to the demand at specified lubrication points. The effects of prejudicial variables (viscosity variations, temperature variations or increasing contamination) on the control functions are automatically eliminated by comparing the detected value (actual number of piston strokes) to the reference value (rated number of piston strokes).

In both lubrication systems 40 and 60, fixed throttle F is to be exchanged against another one when the volume flow adjustment range obtainable by means of proportional solenoid 15 should no longer be sufficient.

We claim:

1. A lubricant supply limiting device for a lubricant distribution system comprising a pressurized lubricant supply path, at least one fixed throttle and a servo pressure controller having variable throttle means, both said fixed throttle and said variable throttle means being disposed in the lubricant path, said controller being downstream of and responsive to variations in the pressure drop over the fixed throttle, said variable throttle means including an adjustment member for controlling the flow of lubricant through the controller and a proportional solenoid for adjusting the position of the adjustment member, wherein said proportional solenoid acts directly on said adjustment member of said variable throttle means through a push rod, and wherein said proportional solenoid has a stroke ($S_1$) and said adjustment member has a stroke (S), and wherein said stroke ($S_1$) is greater than said stroke (S) of said adjustment member between a position where the variable throttle is in a barely closed position and a fully opened position.

2. The lubricant supply limiting device of claim 1, wherein said proportional solenoid is a wet solenoid.

3. The lubricant supply limiting device of claim 1 in which said proportional solenoid is an electric current responsive, magnetic force generating solenoid having a first stroke sector (I) with substantially constant magnetic force and a second stroke sector (II) with proportionally varying magnetic force, said proportional solenoid acting on said adjustment member in such a manner that said adjustment member is subjected to the action of the magnetic force in either the first sector (I) or the second sector (II) over said stroke (S) of the adjustment member of the variable throttle means.

4. The lubricant supply limiting device of claim 3, in which the magnetic force acts on said adjustment member in the opening direction.

5. The lubricant supply limiting device of claim 3, in which the magnetic force acts on said adjustment member in the closing direction.

6. The lubricant supply limiting device of claim 3, including spring means acting on said adjustment member in parallel to the action of said proportional solenoid, the spring force of said spring means permitting a minimum opening of said variable throttle to be maintained in case of a failure of said proportional solenoid.

7. The lubricant supply limiting device of claim 6, in which said proportional solenoid starts to exert its magnetic force in the first or in the second sector at the minimum opening of said variable throttle as determined by said spring means.

8. A lubricant supply limiting device for a lubricant distribution system comprising a pressurized lubricant supply path, at least one fixed throttle and a servo pressure controller having variable throttle means, both said fixed throttle and said variable throttle means being disposed in the lubricant path, said controller being downstream of and responsive to variations in the pressure drop over the fixed throttle, said variable throttle means including an adjustment member for controlling the flow of lubricant through the controller and a proportional solenoid for adjusting the position of the adjustment member, and wherein said fixed throttle is interchangeable with another fixed throttle.

9. A lubricant supply limiting device for a lubricant distribution system comprising a pressurized lubricant supply path, at least one fixed throttle and a servo pressure controller having variable throttle means, both said fixed throttle and said variable throttle means being disposed in the lubricant path, said controller being downstream of and responsive to variations in the pressure drop over the fixed throttle, said variable throttle means including an adjustment member for controlling the flow of lubricant through the controller and a proportional solenoid for adjusting the position of the adjustment member, wherein said proportional solenoid acts directly on said adjustment member of said variable throttle through a push rod, the device further comprising a housing in which said fixed throttle and said variable throttle means are located, said proportional solenoid being attached to said housing with its push rod for actuating said adjustment member projecting into said housing.

10. The lubricant supply limiting device of claim 9, in which said housing includes an internal axial flow through chamber having inlet ports at an inlet end of the chamber and the outlet ports at an outlet end, and in which said adjustment member is a cup-shaped piston axially mounted in the chamber between said inlet and outlet ends, said piston having a head end adjacent said inlet end, said head end of the piston carrying said fixed throttle, said piston also having control edges on an end opposed to said head end, said control edges cooperating with the outlet ports to form a variable throttle, said push rod of said proportional solenoid acting on a side of the cup-shaped piston opposite from said fixed throttle.

11. The lubricant supply limiting device of claim 10 in which a compression spring axially surrounding said push rod acts on said cup-shaped piston.

12. A lubricant system comprising a lubricant supply limiting device, a pressurized source for the lubricant located upstream of said supply limiting device, and control means responsive to requirements of specific points in the system for varying the lubrication flow downstream of said supply limiting device, said lubricant supply limiting device comprising a pressurized lubricant supply path, at least one fixed throttle and a servo pressure controller having variable throttle means, both said fixed throttle and said variable throttle means being disposed in the lubricant path, said controller being downstream of and responsive to variations in the pressure drop over the fixed throttle, said variable throttle means including an adjustment member for controlling the flow of lubricant through the controller and a proportional solenoid for adjusting the position of the adjustment member, and said control means comprising a demand-responsive current control circuit operable to vary the current supplied to said proportional solenoid acting on said adjustment member of the variable throttle means of said servo pressure controller.

13. The lubrication system of claim 12, including a monitoring device for detecting limit values of the lubricant flow downstream of said supply limiting device.

14. The lubrication system of claim 13, including a progressive-piston distributor connected to the supply limiting device, an electric stroke detector device connected to at least one piston of said progressive-piston distributor, the output side of said stroke detector device being connected to said limit value monitoring device.

15. The lubrication system of claim 14, in which the servo pressure controller of said supply limiting device is incorporated in a closed control loop through said proportional solenoid of its adjustment member, and said proportional solenoid is operable to automatically adjust the lubricant flow to varying lubrication conditions.

16. The lubrication system of claim 15, wherein said proportional solenoid is incorporated in a closed control loop in which said control means is a current control device connected to a reference value generator operable to generate reference values for specified lubrication points, and said stroke detector device has its output side connected to the control input of said current control device.

* * * * *